Sept. 12, 1961 R. W. BECKWITH 2,999,948

SIGNAL TRANSMISSION CIRCUIT

Filed May 15, 1958 2 Sheets-Sheet 1

INVENTOR.
ROBERT W. BECKWITH

BY George V. Eltgroth

ATTORNEY

Sept. 12, 1961 R. W. BECKWITH 2,999,948

SIGNAL TRANSMISSION CIRCUIT

Filed May 15, 1958 2 Sheets-Sheet 2

INVENTOR.
ROBERT W. BECKWITH
BY
George V. Eltgroth
ATTORNEY

United States Patent Office 2,999,948
Patented Sept. 12, 1961

2,999,948
SIGNAL TRANSMISSION CIRCUIT

Robert W. Beckwith, Fayetteville, N.Y.

Filed May 15, 1958, Ser. No. 735,563
3 Claims. (Cl. 307—88.5)

This invention relates to signal transmission circuits and more particularly to transmission circuits which in response to signals of varying polarity can affect more than two operations or convey more than two types of information.

In many systems, control or information signals are transmitted from a source to a receiver as signals of different frequencies. Signals of a first frequency are transmitted to indicate a first type of information or a first control operation and signals of a second frequency are transmitted to indicate a second type of information or a second control operation. In order to transmit an indication of a third type of information or a third control operation over the same transmission system, a signal alternating between the first and second frequencies may be transmitted. A system comprising the third control operation of alternating transmission between the two frequencies is described and claimed in the co-pending U.S. application of Robert W. Beckwith, Serial No. 302,049, filed August 1, 1952, and assigned to the same assignee, of which this is a continuation-in-part. This application has since matured to Patent No. 2,871,463, granted on January 27, 1959.

At the receiver, the first frequency signal is detected and retransmitted as a signal of one polarity and the second frequency signal is detected and retransmitted as a signal of the opposite polarity. The alternating frequency signal is also detected and retransmitted as a signal which alternates between the two polarities. Thus three signals are retransmitted; a first signal of a first polarity, a second signal of a second polarity, and a third signal of alternating polarity.

In order to control different operations, it is necessary to separately detect these three signals before transmitting them to the control circuits.

In the communications field it is particularly advantageous to employ two frequencies or two polarities to transmit more than two types of information.

It is a general object of the invention, therefore, to provide a transmission system which is responsive to signals of opposite polarity and alternating polarity to affect at least three control operations or convey at least three types of information.

It is another object of the invention to provide a transmission system which receives signals having three different characteristics and separately detects the different characteristics for retransmission to utilization units.

It is another object of the invention to provide a transmission system which receives signals of opposite or alternating polarity and transmits these as signals of the same polarity to separate utilization units.

It is a further object of the invention to satisfy the above and other objects with a transmission system which while relatively simple and inexpensive is very reliable.

Briefly, in accordance with one aspect of the invention, a transmission system is provided for combination with an impedance across which appear signals of one or the other polarity and signals of alternating polarity. The transmission system includes first and second unilaterally-conducting devices for coupling respective output terminals so that the unidirectional output of one or the other polarity across the impedance appears as a unidirectional output of corresponding polarity across the output terminals. First and second filter means respectively couple the first and second output terminals to a reference potential point so that an alternating polarity input across the impedance appears as a unidirectional output of the same polarity between each of the output terminals and the reference potential point.

Other objects, features and advantages of the invention will be evident from the following detailed description when read in connection with the accompanying drawings wherein.

Figure 1:
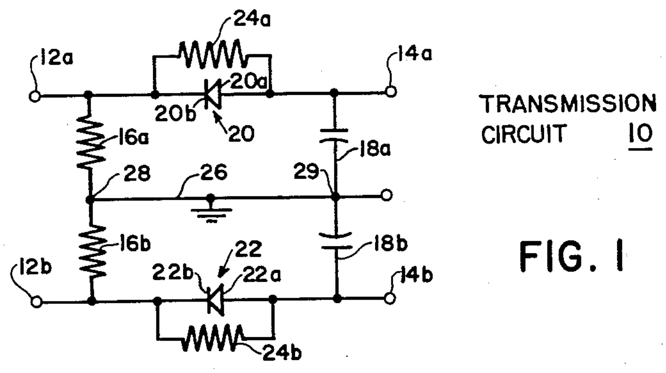
FIGURE 1 is a schematic diagram of a transmission circuit in accordance with an embodiment of the invention.

Referring to FIGURE 1, a transmission circuit 10 is shown having a pair of input terminals 12*a* and 12*b* and a pair of output terminals 14*a* and 14*b*. Disposed across the input terminals 12*a* and 12*b* is an impedance comprising a pair of serially connected resistors 16*a* and 16*b*. Capacitors 18*a* and 18*b*, serially disposed between the output terminals 14*a* and 14*b*, provide filtering means for signals transmitted from the input terminals 12*a* and 12*b* to the output terminals 14*a* and 14*b*. A diode 20 having an anode 20*a* connected to the output terminal 14*a* and a cathode 20*b* connected to the input terminal 12*a* couples the input terminal 12*a* to the output terminal 14*a*. A diode 22 having an anode 22*a* connected to the output terminal 14*b* and a cathode 22*b* connected to the input terminal 12*b* couples the input terminal 12*b* to the output terminal 14*b*.

Respectively connected in parallel with the diodes 20 and 22 are resistors 24*a* and 24*b* to permit the discharge of the capacitors 18*a* and 18*b* respectively. A grounded conductor 26 couples the junction 28 of the resistors 16*a* and 16*b* to the junction 29 of the capacitors 18*a* and 18*b*. The diodes 20 and 22 are unilaterally conducting devices.

During operation, when the potential of the input terminal 12*a* is negative with respect to both the potential of the input terminal 12*b* and the potential of the grounded conductor 26, the capacitor 18*a* "discharges" (i.e., acquires a negative charge) through the diode 20 and a negative signal is present at the output terminal 14*a*. The potential of the output terminal 14*a* is negative with respect to both the potential of the output terminal 14*b* and the potential of the grounded conductor 26 which may be considered the reference potential point. However, when the potential at the input terminal 12*a* returns to a positive value with respect to the reference potential, the capacitor 18*a* "recharges" (i.e., loses negative charge) primarily via the resistor 24*a* and the potential of the output terminal 14*a* returns to approximately the reference potential.

Similarly, when the potential of the input terminal 12*b* is negative with respect to both the potential of the input terminal 12*a* and the reference potential of grounded conductor 26, the capacitor 18*b* "discharges" through the diode 22 and a negative signal is present at the output terminal 14*b*. The potential of the output terminal 14*b* is negative with respect to the potential of the output terminal 14*a* and the reference potential. However, when the potential of the input terminal 12*b* rises from the negative value, the capacitor 18b "charges" through the resistor 24b and the potential of the output terminal 14a returns to substantially the reference point.

When the potential across the input terminals 12a and 12b periodically varies, the potentials of both output terminals 14a and 14b become negative with respect to the reference potential. This is because the periodicity of the alternations are known so by selecting the values of the resistors 24a and 24b and the capacitors 18a and 18b to provide time constants which are significantly greater than the period of alternation (as is hereinafter more fully described). Thus, the alternating potential signals are filtered and the signals at the output terminals 14a and 14b are substantially constant and of the same (negative) polarity. The filter means comprise capacitors 18a and 18b.

More particularly, when the potential at input terminal 12a is positive, the diode 20 does not conduct because its cathode 20b is more positive than its anode 20a. Thus, the capacitor 18a has to be charged via the resistor 24a. Since the values of the resistor 24a-capacitor 18a circuit are chosen to have a relatively high time constant with respect to the periodicity of the alternations, relatively little charging of the capacitor 18a occurs while the potential of the input terminal 12a is positive. However, when the potential of input terminal 12a is negative, diode 20 conducts because its anode 20a is more positive than its cathode 20b permitting the capacitor 18a to rapidly discharge since the conductive resistance of the diode 20 is very small. The net result of relatively slow charging (accumulation of positive charge on the plate of capacitor 18a coupled to terminal 14a) and relatively rapid discharging of capacitor 18a (depletion of positive charge on the plate 4 capacitor 18a) due to signals of alternating polarity at the input terminal 12a is the development of a negative potential at output terminal 14a.

Similarly when the potential of input terminal 12b alternates in polarity, the potential at output terminal 12b is negative due to the operation of diode 22.

Figure 2:
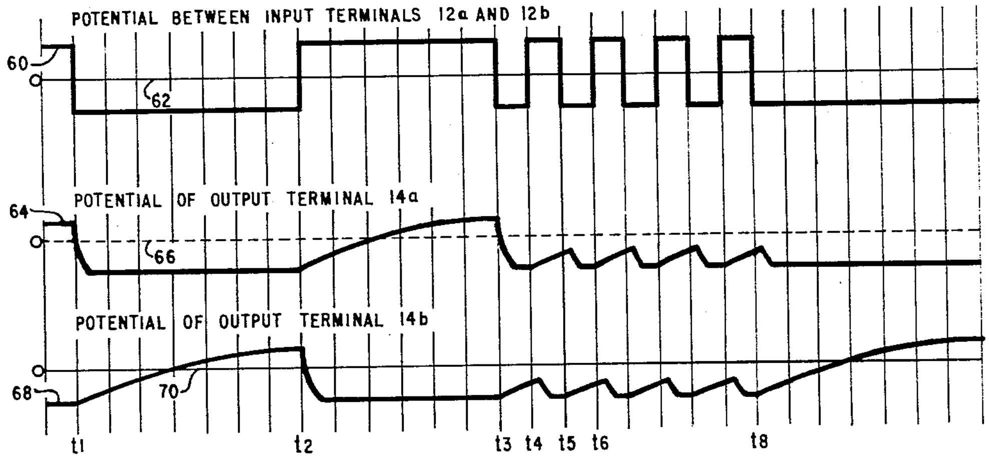
FIGURE 2 shows waveforms at particular points in the circuit of FIGURE 1 during the transmission of representative signals.

To more clearly point out the operation of the transmission circuit 10, voltage waveforms are plotted with respect to time at pertinent points in the transmission circuit 10 as shown in FIGURE 2. In particular, the waveform 60 shows the potential of the input terminal 12a with respect to the input terminal 12b with the reference potential indicated by line 62; the waveform 64 shows the potential of output terminal 14a with respect to the reference potential represented by line 66; and the waveform 68 shows the potential of the output terminal 14b with respect to the reference potential indicated by line 70.

At time $t_1$ the potential of the input terminal 12a goes negative with respect to both the input terminal 12b and the reference potential and accordingly the potential of the input terminal 12b goes positive with respect to the input terminal 12a and the reference potential. There is a rapid decrease in the potential of the output terminal 14a (waveform 64) because of the short time constant associated with primarily the forward resistance of the diode 20a and capacitor 18a. The forward resistance of the diode 20a may be in the order of one hundred ohms. At the same time, there is a slow rise in the potential of the output terminal 14b (waveform 68) because of the long time constant associated primarily with the resistor 24b and the capacitor 18b. The reverse resistance of the diode 22 is very much larger than the resistance of the resistor 24b which is very much larger than the forward resistance of the diode 20.

At time $t_2$ the potentials on the input terminals 12a and 12b reverse. Accordingly, there is a rapid drop in the potential of the output terminal 14b (waveform 68) because of the short time constant associated primarily with the forward resistance of the diode 22 and capacitor 18b; and a slow rise in the potential at the output terminal 14a (waveform 64) because of the long time constant associated primarily with the resistor 24a and the capacitor 18a.

During the interval between time $t_3$ and time $t_8$, the potentials at the input terminals 12a and 12b are alternating. At time $t_3$ the potential at the input terminal 12a (waveform 60) goes negative with respect to input terminal 12b. There is the same rapid drop of the potential at the output terminal 14a (waveform 64), and the same slow rise of the potential at the output terminal 14b (waveform 68) as at time $t_1$. However, at time $t_4$ before there is any appreciable rise in the potential at output terminal 14b, the potentials at the input terminals 12a and 12b reverse. The potential at the output terminal 14b drops to the value it had at time $t_3$ and the potential at the output terminal 14a starts slowly rising. Again, at time $t_5$ there is a reversal of input potentials and the potential of the output terminal 14a which has scarcely risen returns to the potential existing at $t_4$. Thus as long as the alternations of the potential across the input terminals 12a and 12b are present the potentials at each of the output terminals 14a and 14b are at substantially constant negative values with respect to the reference potential.

In summary, the transmission circuit 10 has the following properties:

(1) When a signal of unidirectional polarity (say plus-minus) is present between its input terminals, a potential of corresponding unidirectional polarity (plus-minus) is present between its output terminals, and (2) When a signal of alternating polarity is received at its input terminals, potentials of the same unidirectional polarity (and not of alternating polarity) with respect to the reference potential are present at both of its output terminals.

It should be noted that by reversing the polarities of the diodes 20 and 22 (i.e., the anodes 20a and 22a are rspectively coupled to the input terminals 12a and 12b instead of the output terminals 14a and 14b) positive potential signals are readily handled. In other words, positive potential signals received at the input terminals 12a and 12b are respectively transmitted as positive potential signals by the output terminals 14a and 14b and alternating potential signals at the input terminals 12a and 12b are transmitted as positive potential signals by the output terminals 14a and 14b.

Figure 3:
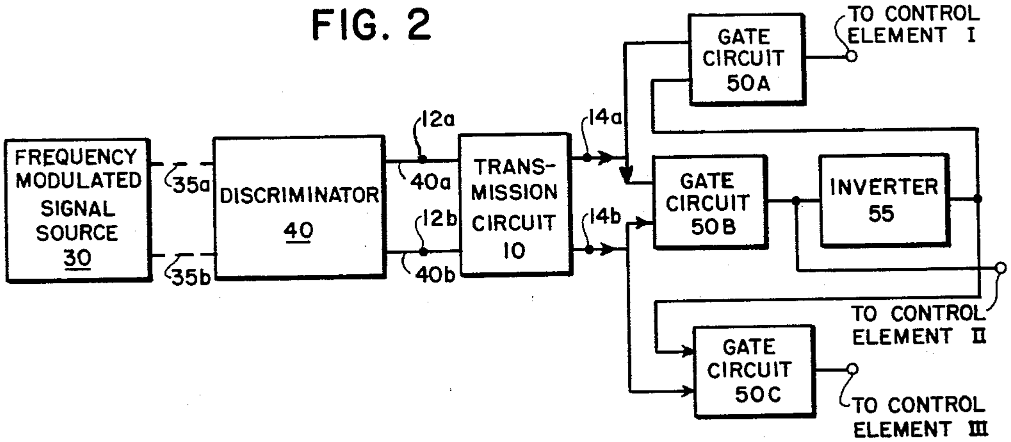
FIGURE 3 show in block diagram form a control system which utilizes the transmission circuit of FIGURE 1.

One of the many uses for transmission circuit 10 of FIGURE 1 is illustrated in FIGURE 3, which shows a specific application in a control system.

The control sytsem of FIGURE 3 includes a remotely located frequency modulated signal source 30 which transmits, at different times, signals having a first frequency or a second frequency, or signals periodically varying between the first and second frequencies. A discriminator 40 is coupled via lines 35a and 35b to the frequency modulated signal source 30.

The discriminator 40 may be of the type disclosed in U.S. Patent No. 2,461,956 to Robert W. Beckwith when the transmission circuit 10 is designed to transmit signals of negative polarity. The discriminator 40 transmits unidirectional signals. Its output terminal 40a is negative with respect to its output terminal 40b when detecting the first frequency signal and its output terminal 40a is positive with respect to the output terminal 40b when detecting the second frequency signal. When the signals received by the discriminator 40 periodically alternate between the first and second frequencies, the signals transmitted from the output terminals 40a and 40b periodically alternate in polarity.

Transmission circuit 10 receives signals from the discriminator 40 and transmits the signals over a plurality of channels to control elements I, II or III via gate circuits 50A, 50B and 50C. The control elements I, II and III (not shown) may be switching circuits which are activated upon receipt of signals having a predetermined polarity. For example, the control elements may include transistors which are turned on by the receipt of signals of predetermined polarity. Further, signalling circuits may be used in place of the control circuits in communication applications when three types of information are used.

When the transmission circuit 10 is designed to transmit negative potential signals, the gate circuits 50 are "or" circuits which may be conventional diode gating circuits as shown and described on page 32 of "Arithmetic Operations in Digital Computers" by R. K. Richards, published by Van Nostrand in 1955.

Diode "or" circuits are essentially coincidence gates for negative potential signals, i.e., an "or" circuit will transmit a negative potential signal from its output terminal while negative potential signals are present at all of its input terminals. This action results from the property that an "or" circuit is designed to transmit from its output terminals the most positive potential present at any of its input terminals. Thus, when all the input terminals are at negative potentials, the signal transmitted is the most positive of this group of negative potentials which is, in fact, a negative potential.

The inverter 55 may be any conventional inverter which reverses the polarity of received signals.

The operation of the control system of FIGURE 3 will be described with the transmission circuit 10 designed to transmit negative signals so that the gate circuits 50 would be "or" circuits and the control elements would be operated by negative signals.

When a first frequency signal is transmitted from frequency modulated signal source 30, the discriminator 40 feeds a signal to the transmission circuit 10 such that the potential of the input terminal **12*a* is negative with respect to the input terminal 12*b* and therefore the potential of output terminal 14*a* is negative with respect to output terminal 14*b***.

The "or" gate circuit 50B passes the positive potential signal from output terminal **14*b* to the inverter 55 which inverts the signal to feed a negative potential signal to the gate circuit 50A. Thus, a negative signal is transmitted from the output terminal 14*a* via the "or" gate circuit 50A to control element I. When a second frequency signal is transmitted from frequency modulated source 30, the potentials developed across the input terminals 12*a* and 12*b* by the discriminator 40 are reversed and a negative signal is transmitted from the output terminal 14*b* via the "or" gate circuit 50C to the control element III because the positive potential signal at the output terminal 14A is passed by the "or" gate circuit 50B, inverted by the inverter 55 and fed to the "or" gate circuit 50C. However, when a signal alternating periodically between the first and second frequencies is received from the frequency modulated source 30 by the discriminator 40, the signals appearing across the input terminals 12*a* and 12*b* alternate in polarity and negative signals are simultaneously transmitted from the output terminals 14*a* and 14*b* via the "or" gate 50B to the control element II and the inverter 55. The inverter 55 inverts the negative signal to pass positive signals which block the "or" gate circuits 50A and 50C**. Therefore, one of three control elements may be activated using signals of only two polarities.

However, when the transmission circuit 10 is designed to transmit signals of positive polarity in order to activate control elements with positive signals, the gate circuits 50 are "and" circuits which may be conventional diode gating circuits as shown and described on the same page of the above cited "Arithmetic Operations in Digital Computers."

Diode "and" circuits are essentially coincidence gates for positive potential signals, i.e., an "and" circuit will transmit a positive potential signal from its output terminal while positive potential signals are present at all its input terminals. This action results from the property that an "and" circuit will transmit from its output terminal the most negative potential present at any of its input terminals. Thus, when the input terminals are at positive potentials, the signal transmitted is the most negative of this group of positive potentials which is, in fact, a positive potential.

Figure 4:
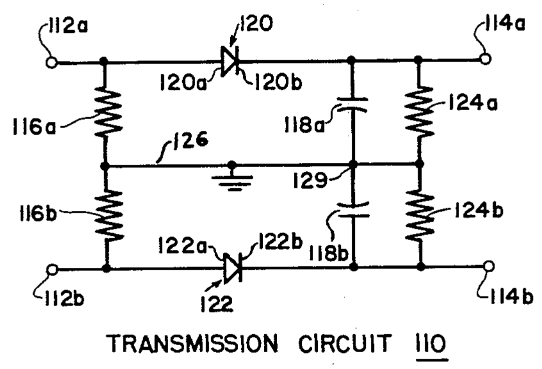
FIGURE 4 is a schematic diagram of another transmission circuit in accordance with another embodiment of the invention.

Another embodiment of the invention is shown in FIGURE 4 for a transmission circuit 110 having a pair of input terminals **112*a* and 112*b* and a pair of output terminals 114*a* and 114*b*. Disposed across the input terminals 112*a* and 112*b* is an impedance comprising a pair of serially connected resistors 116*a* and 116*b*. Capacitors 118*a* and 118*b*, serially disposed between the output terminals 114*a* and 114*b*, provide filtering means for signals transmitted from the input terminals 112*a* and 112*b* to the output terminals 114*a* and 114*b*. A diode 120 having an anode 120*a* connected to an input terminal 112*a* and a cathode 120*b* connected to output terminal 114*a* couples the input terminal 112*a* to the output terminal 114*a*. A diode 122 having an anode 122*a* connected to input terminal 112*b* and a cathode 122*b* connected to output terminal 114*b* couples the input terminal 112*b* to the output terminal 114*b*. Respectively connected in parallel with the capacitors 118*a* and 118*b* are resistors 124*a* and 124*b* to permit the discharge of the capacitors 118*a* and 118*b* respectively. A grounded conductor 126 couples the junction 128 of the resistors 116*a* and 116*b* to the junction 129 of the capacitors 118*a* and 118*b***.

During operation, when the potential of the input terminal **112*a* is positive with respect to both the potential of the input terminal 112*b* and the potential of the grounded conductor 126, the capacitor 118*a* "charges" (i.e., acquires a positive charge) through the diode 120 and a positive signal is present at the output terminal 114*a*. The potential of the output terminal 114*a* is positive with respect to both the potential of the output terminal 114*b* and the potential of the grounded conductor 126 which may be considered the reference potential point. However when the potential at the input terminal 112*a* returns to a negative value with respect to the reference potential the capacitor 118*a* "discharges" (i.e., loses positive charge) primarily via the resistor 124*a*, and the potential of the output terminal 114*a*** returns to approximately the reference potential.

Similarly, when the potential of the input terminal **112*b* is positive with respect to both the potential of the input terminal 112*a* and the reference potential of grounded conductor 126, the capacitor 118*b* "charges" through the diode 122 and a positive signal is present at the output terminal 114*b*. The potential of the output terminal 114*b* is positive with respect to the potential of the output terminal 114*a* and the reference potential. However, when the potential of the input terminal 112*b* falls from the positive value, the capacitor 118*b* "discharges" through the resistor 124*b* and the potential of the output terminal 114*b*** returns to substantially the reference potential.

When the potential across the input terminals **112*a* and 112*b* periodically varies, the potentials of both output terminals 114*a* and 114*b* become positive with respect to the reference potential. This is because the periodicity of the alternations is known, so by selecting the values of the capacitors 118*a* and 118*b* and the resistors 124*a* and 124*b* to provide time constants which are significantly greater than the period of alternation, as is hereinafter more fully described, the alternating potential signals are "filtered" and the signals at the output terminals 114*a* and 114*b*** are substantially constant and of the same (positive) polarity.

More particularly, when the potential at input terminal **112*a* is negative, the diode 120 does not conduct because its cathode 120*b* is more positive than its anode 120*a*. Thus, the capacitor 118*a* has to be discharged via the resistor 124*a*. Since the values of the resistor 124*a*-capacitor 118*a* circuit are chosen to have a relatively high time constant with respect to the periodicity of the alternations; relatively little discharging of the capacitor 118***a* occurs while the potential of the input terminal 112*a* is negative. However, when the potential of input terminal 112*a* is positive, diode 120 conducts because its anode 120*a* is more positive than its cathode 120*b* permitting the capacitor 118*a* to rapidly charge since the forward resistance of diode 120 is very small. The net result of relatively rapid charging and relatively slow discharging of capacitor 118*a* due to signals of alternating polarity at the input terminal 112*a* is the development of a positive potential at output terminal 114*a*.

Similarly when the potential of input terminal 112*b* alternates in polarity, the potential at output terminal 114*b* is positive due to the operation of diode 122.

Figure 5:
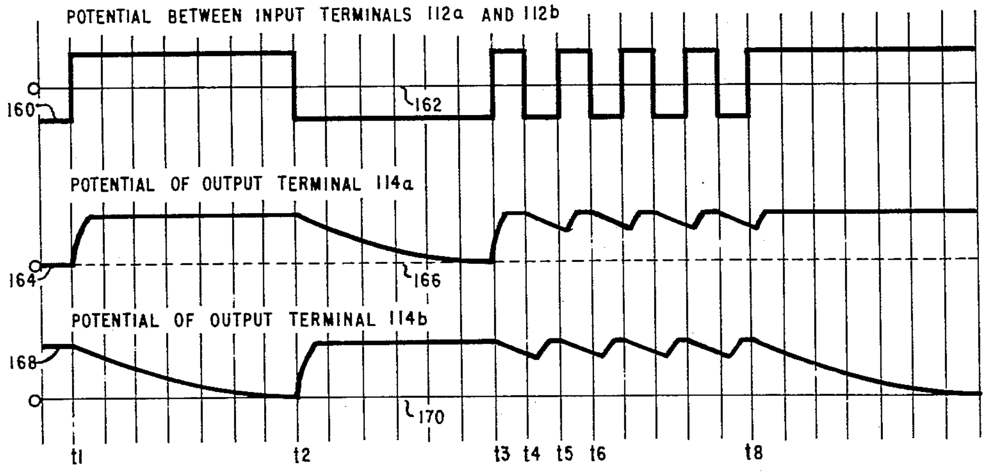
FIGURE 5 shows waveforms at particular points in the circuit of FIGURE 4 during the transmission of representative signals.

To more clearly point out the operation of the transmission circuit 110, voltage waveforms are plotted with respect to time at pertinent points in the transmission circuit 110 as shown in FIGURE 5. In particular, the waveform 160 shows the potential of the input terminal 112*a* with respect to the input terminal 112*b* with the reference potential indicated by line 162. The waveform 164 shows the potential of the output terminal 114*a* with respect to the reference potential represented by line 166; and the waveform 168 shows the potential of output terminal 114*b* with respect to the reference potential indicated by line 170.

At time $t_1$ the potential of input terminal 112*a* goes positive with respect to both the input terminal 112*b* and the reference potential and accordingly the potential of the input terminal 112*b* goes negative with respect to the input terminal 112*a* and the reference potential. There is a rapid increase in the potential of the output terminal 114*a* (waveform 64) because of the short time constant associated with primarily the forward resistance of the diode 120 and capacitor 118*a*. The forward resistance of the diode 120 is in the order of one hundred ohms. At the same time, there is a slow fall in the potential of the output terminal 114*b* (waveform 168) because of the long time constant associated primarily with the resistor 124*b* and the capacitor 118*b*.

At time $t_2$ the potentials on the input terminals 112*a* and 112*b* reverse. Accordingly, there is a rapid rise in the potential of the output terminal 114*b* (waveform 168) because of the short time constant associated primarily with the forward resistance of the diode 122 and capacitor 118*b*; and a slow drop in the potential at the output terminal 114*a* (waveform 164) because of the long time constant associated primarily with the resistor 124*a* and the capacitor 118*a*.

During the interval between time $t_3$ and time $t_8$, the potentials at the input terminals 112*a* and 112*b* are alternating. At time $t_3$, the potential at the input terminal 112*a* (waveform 160) goes positive with respect to input terminal 112*b*. There is the same rapid rise of the potential at the output terminal 114*a* (waveform 164) and the same slow drop of the potential at the output terminal 114*b* (waveform 168) as at time $t_1$. However, at time $t_4$ before there is any appreciable drop in the potential at output terminal 114*b*, the potentials at the input terminals 112*a* and 112*b* reverse. The potential at the output terminal 114*b* rises to the value it had at time $t_3$ and the potential at the output terminal 114*a* starts slowly falling. Again, at time $t_5$ there is a reversal of input potentials and the potential of the output terminal 114*a* which has scarcely fallen returns to the potential existing at $t_4$. Thus as long as the alternations of the potential across the input terminals 112*a* and 112*b* are present the potentials at each of the output terminals 114*a* and 114*b* are at substantially constant positive values with respect to the reference potential.

In summary the transmission circuit 110 has the following properties:

(1) When a signal of unidirectional polarity (say plus-minus) is present between its input terminals, a potential of corresponding unidirectional polarity (plus-minus) is present between its output terminals, and (2) When a signal of alternating polarity is received at its input terminals, potentials of the same unidirectional polarity (and not of alternating polarity) with respect to the reference potential are present at both of its output terminals.

It should be noted that by reversing the polarities of the diodes 120 and 122 (i.e., the anodes 120*a* and 122*a* are respectively coupled to the input terminals 112*a* and 112*b* instead of the output terminals 114*a* and 114*b*) negative potential signals are readily handled. In other words, negative potential signals received at the input terminals 112*a* and 112*b* are respectively transmitted as negative potential signals by the output terminals 114*a* and 114*b* and alternating potential signals at the input terminals 112*a* and 112*b* are transmitted as negative potential signals by the output terminals 114*a* and 114*b*.

The transmission circuit 110 of FIGURE 4 may be utilized in the control system of FIGURE 3 in a manner similar to that of the transmission circuit 10, of FIGURE 1.

It should be noted that the resistors 24*a* and 24*b* of the transmission circuit 10 of FIGURE 1 are included to complete charging paths to ground in shunt with the diodes 20 and 22 respectively. The charging path (when the system handles negative signals) and the discharging path (when the system handles positive signals) for the capacitor 18*a* includes both the resistor 24*a* and 16. The charging path (when the system handles negative signals) and the discharging path (when the system handles positive signals) for the capacitor 18*b* includes both the resistor 24*b* and resistor 16*b*. If the response time the system requires is quite long then it may be possible to eliminate the resistors 24*a* and 24*b* and allow the capacitors 18*a* and 18*b* to respectively charge or discharge through the high "back" resistances of the diodes 20 and 22.

However, if the response time required is too short then the resistors 24*a* and 24*b* are required. There is an upper limit of value for these resistors. For example, the sum of the resistor 24*a* and resistor 16*a* should be such that the capacitor 18*a* sufficiently charges or discharges to an inactive potential within the maximum allowable response time required by the system. In other words, the time constant of the resistor-capacitor combinations should be less than the response time required by the system. Thus, it is desirable in view of the response time requirement to choose the values of resistors 24*a* and 24*b* to be as small as possible.

However, there is a lower limit to the value of these resistors. This lower value is determined by the periodicity of alternations. In order to insure that the terminals 14*a* and 14*b* have potentials of sufficient magnitude during the entire cycle of an alternation, the resistors 24*a* and 24*b* must be of sufficient magnitude to prevent appreciable charging or discharging, as the case may be, of the capacitors 18*a* and 18*b* respectively during the cycle. In other words, the time constant of the resistor-capacitor combinations must be greater than the periodicity of alternation.

Similarly, the resistors 124*a* and 124*b* of FIG. 4 are subject to the same requirements. However, in this case the resistors 116*a* and 116*b* are not included in the time constant considerations for the capacitor discharge paths (when the system handles positive signals) and charge paths (when the system handles negative signals). In either event, the resistors 124*a* and 124*b* alone respectively provide the resistances in the paths.

There has thus been shown a transmission circuit which can receive signals having three different characteristics to affect at least three control operations or convey at least three types of information. More specifically, the transmission circuit receives signals of first, second or alternating polarities and transmits from separate output terminals signals of the same polarity. Furthermore the transmission circuit of the invention is extremely reliable and at the same time relatively simple and inexpensive to manufacture.

While only a limited number of embodiments of the invention has been shown, it will be now obvious to those skilled in the art that many modifications and variations may be made without departing from the invention.

What is claimed is:

1. As a new use of an electric circuit adapted to produce, at a first and second output terminal thereof, respectively a first and a second unidirectional potential with respect to a point of reference potential in response to alternating potentials applied across a first and a second input terminal thereof, said circuit comprising a first and a second half-circuit balanced to one another with corresponding components of said half-circuits being balanced to one another, said first and second half-circuit respectively comprising: first and second resistance circuit means connected from said point of reference potential to said first and second input terminals respectively, a first and a second non-linear resistance circuit means interconnecting said first terminals and said second terminals respectively, each said non-linear resistance circuit means including a unidirectional device and having a relatively low resistance when its unidirectional device is in the normal forward conduction state and a relatively high resistance when its unidirectional device is in the reverse conduction state, and a first and a second output reactance circuit means connected from said point of reference potential to said first and second output terminal respectively, the time constants of said half-circuits, as determined by their respective resistive and reactive circuit means, when their respective unidirectional devices are in their said reverse conduction states being greater than the periodicity of alternation of said alternating input potentials, the method comprising applying across said input terminals unidirectional potentials of non-zero magnitude as well as said alternating potentials, whereby to produce at said output terminals, with respect to said point of reference potential, unidirectional potentials, with different combinations of polarities depending on whether unidirectional or alternating potential is applied to said input terminals.

2. As a new use of an electric circuit adapted to produce, at a first and second output terminal thereof, respectively a first and a second unidirectional potential with respect to a point of reference potential in response to alternating potentials applied across a first and a second input terminal thereof, said circuit comprising a first and a second half-circuit balanced to one another with corresponding components of said half-circuits being balanced to one another, said first and second half-circuit respectively comprising: first and second resistance circuit means connected from said point of reference potential to said first and second input terminals respectively, a first and a second non-linear resistance circuit means interconnecting said first terminals and said second terminals respectively, each said non-linear resistance circuit means including a unidirectional device and having a relatively low resistance when its unidirectional device is in the normal forward conduction state and a relatively high resistance when its unidirectional device is in the reverse conduction state, said unidirectional devices being poled in like manner from their respective input terminals to their respective output terminals, and a first and a second essentially purely capacitive circuit means connected from said point of reference potential to said first and second output terminal respectively, the time constants of said half-circuits, as determined by their respective resistive and capacitive circuit means, when their respective unidirectional devices are in their said reverse conduction states being greater than the periodicity of alternation of said alternating input potentials, the method comprising applying across said input terminals alternatively a unidirectional potential of non-zero magnitude and one polarity, and a unidirectional potential of non-zero magnitude and opposite polarity, as well as said alternating potentials, whereby upon application across said input terminals of a unidirectional input potential a pair of unidirectional output potentials are produced at said output terminals that are oppositely poled to one another with respect to said point of reference potential and that experience reversal in polarity upon reversal in polarity of the unidirectional input potential, and whereby upon application of an alternating input potential across said input terminals a pair of like poled unidirectional output potentials are produced at said output terminals with respect to said point of reference potential despite the repeated reversal of polarity of such alternating input potential.

3. As a new use of an electric circuit adapted to produce, at a first and second output terminal thereof, respectively a first and a second unidirectional potential with respect to a point of reference potential in response to alternating potentials applied across a first and a second input terminal thereof, said circuit comprising a first and a second half-circuit balanced to one another with corresponding components of said half-circuits being balanced to one another, said first and second half-circuit respectively comprising: first and second resistance circuit means connected from said point of reference potential to said first and second input terminals respectively, a first and a second non-linear resistance circuit means interconnecting said first terminals and said second terminals respectively, each said non-linear resistance circuit means including a unidirectional device and having a relatively low resistance when its unidirectional device is in the normal forward conduction state and a relatively high resistance when its unidirectional device is in the reverse conduction state, said unidirectional devices being poled in like manner from their respective input terminals to their respective output terminals, and a first and a second resistance-capacitance shunt combination output circuit means connected from said point of reference potential to said first and second output terminal respectively, the time constants of said half-circuits, as determined by their respective resistive and capacitive circuit means, when their respective unidirectional devices are in their said reverse conduction states being greater than the periodicity of alternation of said alternating input potentials, the method comprising applying across said input terminals alternatively a unidirectional potential of non-zero magnitude and one polarity, and a unidirectional potential of non-zero magnitude and opposite polarity, as well as said alternating potentials, whereby upon application across said input terminals of a unidirectional input potential ultimately one output terminal attains a potential having such polarity with respect to said point of reference potential as the non-linear resistance circuit means connected to such one output terminal conducts in said normal forward conduction state while the other output terminal ultimately attains said reference potential, with the output potentials ultimately interchanging with respect to said point of reference potential upon reversal in polarity of the unidirectional input potential, and whereby upon application across said input terminals of an alternating input potential both output terminals attain like poled potentials with respect to said point of reference potential, said like poled potentials being of such polarity as are conducted by said non-linear resistance circuit means in their said normal forward conduction states, despite the repeated reversal of polarity of such alternating input potential.

References Cited in the file of this patent

UNITED STATES PATENTS

| | | |
|---|---|---|
| 2,376,126 | Crosby | May 15, 1945 |
| 2,410,983 | Koch | Nov. 12, 1946 |
| 2,429,788 | Atwood | Oct. 28, 1947 |
| 2,497,840 | Seeley | Feb. 14, 1950 |
| 2,810,885 | Davis et al. | Oct. 22, 1957 |